Oct. 3, 1939.                S. S. ALBERT                 2,175,100
                            SOLDERING IRON
                          Filed Jan. 13, 1938
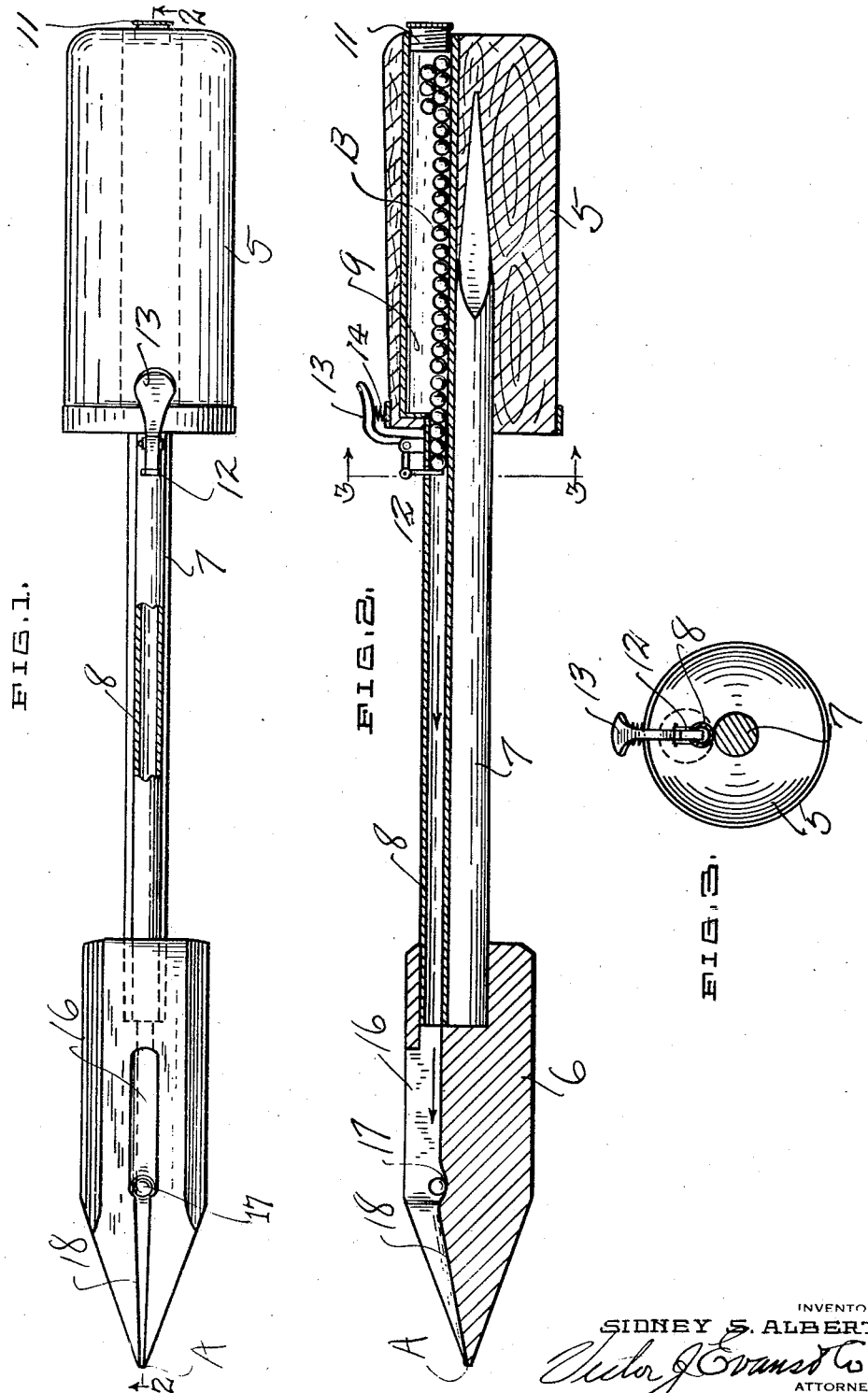
INVENTOR
SIDNEY S. ALBERT.
ATTORNEYS.

Patented Oct. 3, 1939

2,175,100

UNITED STATES PATENT OFFICE 2,175,100

SOLDERING IRON

Sidney Samuel Albert, San Francisco, Calif.

Application January 13, 1938, Serial No. 184,877

1 Claim. (Cl. 113—109)

This invention relates to improvements in soldering irons and has particular reference to a fountain soldering iron wherein the solder is admitted to the iron in the form of small balls that under the influence of heat then melt and flow through a channel to the point of the iron.

A further object is to produce an iron wherein the operator may use both hands, one to handle the soldering iron, and the other to handle the work, which will greatly facilitate the soldering operations, as now it is necessary to stop the soldering operation, move the work to a new position, and then hold the solder in one hand and the iron in the other hand.

Other objects and advantages will be apparent during the course of the following description.

In the accompanying drawing forming a part of this specification and in which like numerals are employed to designate like parts throughout the same, Fig. 1 is a top plan view of my iron, having a portion thereof broken away;

Fig. 2 is a cross sectional view taken on the line 2—2 of Fig. 1; and

Fig. 3 is a cross sectional view taken on the line 3—3 of Fig. 2.

In the accompanying drawing wherein for the purpose of illustration is shown a preferred embodiment of my invention, the numeral 5 designates a handle; the numeral 6, the head of the iron, which is connected by a rod 7 with the handle 5. A tube 8 is carried upon the top of the rod 7 and extends into the head 6 and also into the handle 5. In the handle 5 a storage space 9 is provided, which is closed by a plug 11, and a gate 12, extending into the tube 8, is operated by a finger piece 13, normally held closed by a spring 14. In the head 6 I have formed a slot 16 which has a depression 17 in its bottom and communicates with a tapered slot 18, leading to the point A of the iron.

The result of this construction is that when the storage space 9 is filled with solder balls, as shown at B, the same may be fed through the tube 8 by raising the gate 12 through the action of the finger piece 13. These balls will roll down the tube 8 and into the depression 17 of the slot 16 where the same will melt due to the heat of the head 6, and will then flow down through the slot 18 to the point of the iron and to the work to be soldered.

It is obvious that if the soldering iron is to be operated electrically, the referred to soldering balls will readily melt due to the heat of the heating element placed between the head 6 and the tube 8.

It will be apparent that by regulating the number of balls which go down the tube, the amount of solder may be readily controlled.

I wish to further point out that the rod 7 could be readily converted into a hollow metal tube, wherein electric wires can be carried and the heating element housed so that the iron can be electrically operated.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a soldering iron, a handle, a storage space formed in said handle, a tube communicating with said storage space, a spring actuated gate valve positioned in said tube and adapted to control the discharge of material from said storage space through said tube, a head connected to said tube, an elongated open slot formed in said head and capable of receiving material from said tube, a depression formed in said slot, and an open tapered slot formed in said head and communicating with said first-mentioned slot and terminating at the point of said head, whereby solder may be delivered from said depression to the point of the iron.

SIDNEY SAMUEL ALBERT.